United States Patent
Nario et al.

(10) Patent No.: US 8,918,712 B2
(45) Date of Patent: Dec. 23, 2014

(54) DYNAMICALLY GENERATING A MOBILE APPLICATION

(75) Inventors: Jorge Nario, Westborough, MA (US);
Wen-Ying Chu, Brookline, MA (US);
Rob Chapman, Douglas, MA (US);
Paul Martel, Abington, MA (US);
Yevgeny Safontchik, Groton, MA (US);
Mark Moore, Apex, NC (US); Edward Kelly, Merrimack, NH (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 13/324,662

(22) Filed: Dec. 13, 2011

(65) Prior Publication Data

US 2013/0151996 A1    Jun. 13, 2013

(51) Int. Cl.
*G06F 17/00*       (2006.01)
*G06F 3/048*       (2013.01)
*G06F 3/0481*      (2013.01)

(52) U.S. Cl.
CPC ............ *G06F 3/048* (2013.01); *G06F 3/04817* (2013.01)
USPC ........... 715/239; 715/700; 715/740; 715/809; 715/810; 715/825; 719/328; 705/35

(58) Field of Classification Search
CPC ... G06F 3/048; G06F 3/0481; G06F 3/04817; G06F 3/04842; G06F 9/4443; G06Q 40/06
USPC ................. 715/740, 239, 700, 809, 810, 825; 719/328; 705/35, 35 R
See application file for complete search history.

(56) References Cited

U.S. PATENT DOCUMENTS

| | | | |
|---|---|---|---|
| 7,167,861 B2 | 1/2007 | Majumder et al. | |
| 7,509,374 B2 | 3/2009 | Trinh et al. | |
| 7,730,155 B1* | 6/2010 | Meyer et al. ................... | 709/217 |
| 2002/0038384 A1* | 3/2002 | Khan et al. .................... | 709/245 |
| 2003/0097639 A1 | 5/2003 | Niyogi et al. | |
| 2006/0031228 A1* | 2/2006 | Bosworth et al. ............... | 707/10 |
| 2006/0143622 A1* | 6/2006 | Prabandham et al. ........ | 719/328 |
| 2007/0066364 A1* | 3/2007 | Gil et al. ....................... | 455/566 |
| 2008/0177638 A1 | 7/2008 | Butler | |
| 2008/0208785 A1 | 8/2008 | Trefler et al. | |
| 2008/0276182 A1* | 11/2008 | Leow ............................ | 715/740 |

(Continued)

OTHER PUBLICATIONS

Allen, Sarah, Vidal Graupera, and Lee Lundrigan. Pro smartphone cross-platform development: iPhone, blackberry, windows mobile and android development and distribution. Apress, Sep. 2010.*

(Continued)

*Primary Examiner* — William Bashore
*Assistant Examiner* — James F Sugent
(74) *Attorney, Agent, or Firm* — Proskauer Rose LLP

(57) ABSTRACT

Methods and apparatuses, including computer program products, are described for dynamically generating a mobile application. A server receives a request from a mobile device to launch an application on the mobile device. The server generates a configuration file based on the launched application. The server transmits the configuration file to the mobile device for generation of a user interface of the launched application using the configuration file. The user interface includes a first display area using browser functionality of the mobile device to display one or more web page elements formatted by the server to appear as native to the mobile device. The user interface further includes a second display area having one or more interface elements that are native to an operating system of the mobile device.

23 Claims, 8 Drawing Sheets

(56) References Cited

U.S. PATENT DOCUMENTS

| | | |
|---|---|---|
| 2009/0241135 A1 | 9/2009 | Wong et al. |
| 2009/0254912 A1 | 10/2009 | Roundtree et al. |
| 2009/0300656 A1 | 12/2009 | Bosworth et al. |
| 2009/0320098 A1* | 12/2009 | Roberts et al. ............ 726/3 |
| 2010/0043017 A1 | 2/2010 | Paul et al. |
| 2010/0269152 A1* | 10/2010 | Pahlavan et al. ............ 726/3 |
| 2010/0281475 A1 | 11/2010 | Jain et al. |
| 2011/0113090 A1 | 5/2011 | Peeri |
| 2011/0125838 A1 | 5/2011 | Rao |
| 2011/0210922 A1* | 9/2011 | Griffin ............ 345/173 |
| 2012/0047425 A1* | 2/2012 | Ahmed ............ 715/234 |
| 2014/0026086 A1* | 1/2014 | Zuverink et al. ............ 715/765 |

OTHER PUBLICATIONS (C1) International Search Report and Written Opinion from corresponding PCT patent application number: PCT/US2012/069389, dated Nov. 18, 2013, 11 pages.

\* cited by examiner

DYNAMICALLY GENERATING A MOBILE APPLICATION

FIELD OF THE INVENTION

The subject matter of this application relates generally to methods and apparatuses, including computer program products, for dynamically generating a mobile application.

BACKGROUND OF THE INVENTION

Mobile computing devices, such as smartphones, tablets, and personal data assistants (PDAs) have become increasingly common tools for both entertainment and business productivity. These devices have seen an increase in their hardware processing power, which has contributed to their ability to execute robust applications while taking advantage of user interface feature set provided by the native operating system of the device. Such applications are generally developed, compiled and packaged in advance, and made available to consumers via an online marketplace such as an app store. Users can select applications for purchase and download to the device.

However, updates to such applications, particularly when dealing with a static user interface, generally require extensive development time due to changing of the application code. This leads to an increase in product costs and delayed time for the updates to become available because the applications are changed, recompiled and repackaged, and the user has to re-download the application. Also, due to the increasing number of devices in the marketplace that run different types of operating systems, the development effort must be duplicated to create separate application code for each device/operating system.

SUMMARY OF THE INVENTION

In general overview, the techniques described herein are related to the dynamic generation of mobile applications on mobile devices. The techniques provide for a lightweight container application installed on the mobile device, where the container application builds itself dynamically based on context data associated with the user of the application. The container synthesizes both browser functionality and native operating system functionality to provide a user interface that is easily customizable and server-based, while appearing to the user as if the application is native to the operating system.

The invention, in one aspect, features a computer-implemented method for dynamically generating a mobile application. A server receives a request from a mobile device to launch an application on the mobile device. The server generates a configuration file based on the launched application. The server transmits the configuration file to the mobile device for generation of a user interface of the launched application using the configuration file. The user interface includes a first display area using browser functionality of the mobile device to display one or more web page elements formatted by the server to appear as native to the mobile device. The user interface further includes a second display area having one or more interface elements that are native to an operating system of the mobile device.

The invention, in another aspect, features a computer-implemented method for dynamically generating a mobile application. A mobile device sends a request to a server to launch an application on the mobile device. Thee mobile device receives a configuration file from the server based on the launched application. The mobile device generates a user interface of the launched application using the configuration file. The user interface includes a first display area using browser functionality of the mobile device to display one or more web page elements formatted to appear as native to the mobile device. The user interface further includes a second display area having one or more interface elements that are native to an operating system of the mobile device.

The invention, in another aspect, features a computer-implemented system for dynamically generating a mobile application. The system includes a server configured to receive, from a mobile device, a request to launch an application on the mobile device. The server is further configured to generate a configuration file based on the launched application and transmit, to the mobile device, the configuration file for generation of a user interface of the launched application using the configuration file. The user interface includes a first display area using browser functionality of the mobile device to display one or more web page elements formatted by the server to appear as native to the mobile device. The user interface further includes a second display area having one or more interface elements native to an operating system of the mobile device.

The invention, in another aspect, features a computer-implemented system for dynamically generating a mobile application. The system includes a mobile device configured to send, to a server, a request to launch an application on the mobile device. The mobile device is further configured to receive, from the server, a configuration file based on the launched application and generate a user interface of the launched application using the configuration file. The user interface includes a first display area using browser functionality of the mobile device to display one or more web page elements formatted by the server to appear as native to the mobile device. The user interface further includes a second display area having one or more interface elements that are native to an operating system of the mobile computing device.

The invention, in another aspect, features a computer program product, tangibly embodied in a computer readable storage medium, for dynamically generating a mobile application. The computer program product including instructions operable to cause a data processing apparatus to receive, from a mobile device, a request to launch an application on the mobile device, retrieve a configuration file based on the launched application, and transmit, to the mobile device, the configuration file for generation of, a user interface of the launched application using the configuration file and the web page. The user interface includes a first display area using browser functionality of the mobile device to display one or more web page elements formatted by the server to appear as native to the mobile device. The user interface further includes a second display area having one or more interface elements native to an operating system of the mobile device.

The invention, in another aspect, features a computer program product, tangibly embodied in a computer readable storage medium, for dynamically generating a mobile application. The computer program product including instructions operable to cause a mobile device to send, to a server, a request to launch an application on the mobile device, receive, from the server, a configuration file based on the launched application, and generate a user interface of the launched application using the configuration file. The user interface includes a first display area using browser functionality of the mobile device to display one or more web page elements formatted by the server to appear as native to the mobile device. The user interface further includes a second display area having one or more interface elements that are native to an operating system of the mobile device.

In some embodiments, any of the above aspects can include one or more of the following features. In some embodiments, the user interface includes a third display area. In some embodiments, the first display area includes one or more interface elements that are native to the operating system of the mobile device. In some embodiments, the second display area includes browser functionality of the mobile device to display one or more of the web page elements formatted to appear as native to the mobile device.

In some embodiments, the server receives a login request associated with the launched application from the mobile device. The login request includes user credentials. The server determines a user context based on the user credentials. The server generates a second configuration file based on the user context and transmits, to the mobile device, the second configuration file for generation of the user interface for the launched application.

In some embodiments, generation of the user interface includes removing at least one of an element of the first section and an element of the second section from display based on the user context or the second configuration file. In some embodiments, generation of the user interface includes adding at least one of an element of the first section and an element of the second section to display based on the user context or the second configuration file.

In some embodiments, the server retrieves one or more additional web page elements in response to a navigation command received from the mobile device, and transmits the one or more additional web page elements to the mobile device for display in the first display area. In some embodiments, the server determines which of the one or more additional web page elements to display based on the user context or the second configuration file. In some embodiments, the navigation command includes a server location for the one or more additional web page elements. In some embodiments, the server location is a URL address.

In some embodiments, the user context is associated with a company, a role, an application, a user persona, or any combination thereof. In some embodiments, the configuration file includes URL addresses for retrieving one or more image files from the server, the image files being displayed in at least one of the first display area and the second display area.

In some embodiments, the generating a configuration file includes retrieving, by the server, a stored configuration file based on the identity of the launched application. In some embodiments, the generating a configuration file includes retrieving, by the server, configuration data based on the identity of the launched application, and building, by the server, the configuration file using the retrieved configuration data. In some embodiments, the configuration file is a JSON object.

In some embodiments, the generating a second configuration file includes retrieving, by the server, a stored configuration file based on the user context. In some embodiments, the generating a second configuration file includes retrieving, by the server, configuration data based on the user context, building, by the server, the configuration file using the retrieved configuration data. In some embodiments, the second configuration file is a JSON object.

In some embodiments, the launched application includes function calls associated with functions of the operating system of the mobile device and the one or more web page elements include URL addresses that identify the function calls to request execution of the associated functions by the operating system. In some embodiments, execution of the function calls causes the appearance of the launched application to change.

In some embodiments, the server retrieves one or more additional web page elements based on the launched application, and transmits the one or more additional web page elements to the mobile device for storage at the mobile device and later display in the first display area. In some embodiments, the one or more interface elements are input elements, notification elements, navigation elements, or any combination thereof.

In some embodiments, the mobile device analyzes the configuration file to determine whether an updated version of the launched application is available, and downloads the updated version if available. In some embodiments, the first display area is located inside of a native control of the mobile device.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
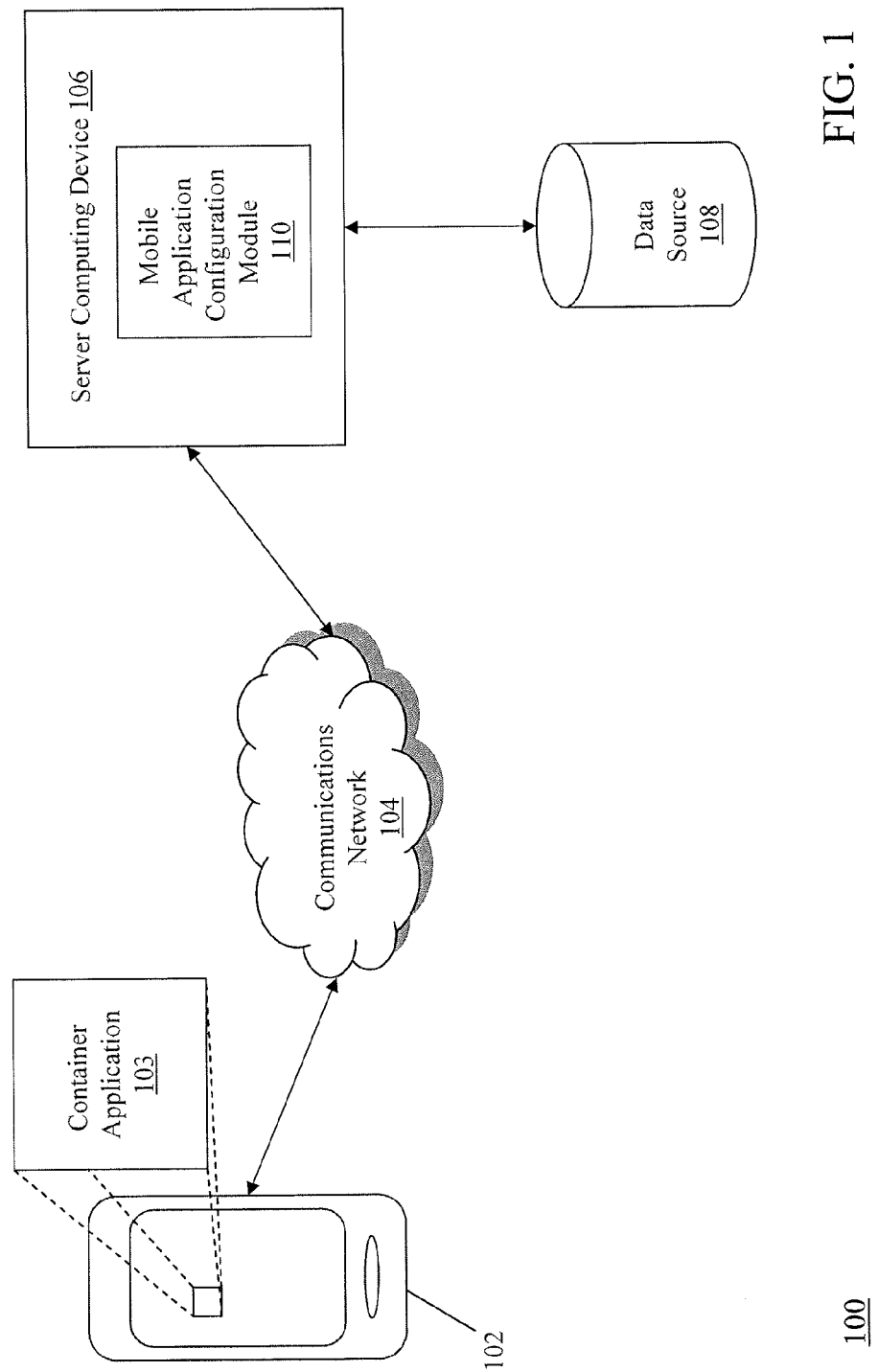
FIG. 1 is a block diagram of a system for dynamically generating a mobile application.

FIG. 1 is a block diagram of a system 100 for dynamically generating a mobile application. The system 100 includes a mobile computing device 102, a communications network 104, a server computing device 106, and a data source 108. The server 106 and the data source 108 can reside at the same physical location or may be dispersed to different physical locations. The server 106 and the data source 108 can be located on the same physical device, or the data source 108 can be distributed on different physical devices. The server 106 and the data source 108 can communicate via a communications network, for example the communications network 104. Although FIG. 1 depicts only a single mobile computing device 102, communications network 104, server computing device 106, and data source 108, the techniques described herein are not limited to this structure. Instead, this system 100 can include any of a number of configurations or components (e.g., multiple mobile computing devices, multiple servers) that do not depart from the scope and spirit of the invention.

The mobile computing device 102 communicates with the server computing device via the communications network 104. Example mobile computing devices 102 can include, but are not limited to a smart phone (e.g., Apple iPhone®) or other mobile communications device, a portable video game system, a tablet computer, an internet appliance, a personal computer, or the like. In some examples, the mobile device 102 can be installed in a vehicle. The mobile device 102 can be configured to include an embedded digital camera apparatus, and a storage module (e.g., Flash memory) to hold photographs, video or other information captured with the camera. The mobile device 102 includes network-interface components to enable the user to connect to a communications network 104, such as the Internet, wireless network (e.g., GPRS, CDMA, RF), or the like.

The mobile device 102 also includes application software that is downloaded from the server computing device 106 to enable a user to view information and perform transactions based on configuration files and other information received from the server computing device 106. In some embodiments, the application software is a proprietary dynamic container application 103 to be installed on the mobile device 102 and written with programmatic code designed to interact with an operating system that is native to the mobile device 102. For example, due to the inherent differences of mobile operating systems, a developer writes a container application 103 for the iOS platform and a separate container application 103 for the Android platform. Although the container application 103 is device- and/or operating system-specific, the application 103 is a binary file that contains baseline features, e.g., for interacting with the native operating system. Instead of containing a large number of hard-coded user interface features which would increase the size of the application, the application 103 leverages a browser-type interface (but appearing native to the user) that receives configuration files from the server 106 for customization of the structure and content. Therefore, the application is small in size and does not increase in size substantially, even as the user interface displayed in the application grows and changes, because the user interface features are driven by the configuration files that are stored at the server 106 and contain web links to the majority of the user interface content. In addition, the application 103 does not need to be repackaged frequently due to the server-based generation and retrieval of user interface elements.

In some embodiments, the container application 103 uses browser-type software or specific functionality (e.g., Web-View in the Android operating system) to enable the application to present formatted information that is received from the server computing device 106 and to contain links and other commands for navigation and/or execution of functionality. The container application 103 may utilize existing browser software or functionality that is already available on the mobile device 102.

In some embodiments, the container application 103 includes a series of screens that contain different information and/or functionality. To enable navigation between the screens, the container application 103 includes input elements such as tabs, buttons, or menu options. These input elements can be part of the native functionality of the mobile device's 102 operating system, the container application's 103 code, the formatted information received from the server computing device 106, or a combination. The container application 103 can use a configuration file received from the server computing device 106 to adjust the appearance and/or functionality of the input elements.

The mobile application configuration module 110 generates the configuration file for use with the container application 103 by retrieving pre-stored configuration data from one or more data sources (e.g., data source 108). The configuration data can be categorized according to a number of different classifications. For example, the configuration data can be customized for a particular user (e.g., John Smith), a particular role (e.g., investment advisor), a particular employer or company (e.g., Fidelity), a particular application (e.g., Wealth Central), or a particular workflow/function. In some embodiments, the mobile application configuration module 110 retrieves a pre-stored configuration file that contains default structure and content based on a particular classification. In some embodiments, the mobile application configuration module 110 dynamically generates the configuration file by determining information about the user's persona, the container application, and other characteristics, then retrieving specific data associated with those characteristics and building the configuration file for transmission to the mobile device 102. Using this technique, the server 106 stores the configuration data and configuration files, which allows the structure and content of the container application 103 user interface to be modified in one location and distributed to many users across different mobile devices and operating systems—instead of requiring discrete development of an application for each platform and forcing users to download an updated version of the container application 103 frequently when changes are made.

The configuration file can be stored in data source 108, or generated by the mobile application configuration module 110, in any number of structures. In one embodiment, the configuration file is a JSON (JavaScript Object Notation) object. JSON is a text-based, position-independent data interchange format consisting of name-value pairs that can be used to map onto the data structures of many different applications. JSON objects are typically lean and lightweight, easy for machines to parse and humans to read, which promotes efficiencies in both generation and transmission of JSON objects. Due to its versatility, openness and simplicity, JSON is well-suited for use in generating both pre-stored configuration files and enabling the he mobile application configuration module 110 to generate configuration files dynamically based on real-time data retrieval. However, other data formats can be used, including but not limited to XML, without altering the spirit or scope of the invention.

The configuration data comprises the structure and content to be presented on the mobile device 102 in the container application 103. For example, the configuration file can indicate that a particular tab in the container application is not displayed. Based on the configuration file, the container application 103 removes the tab from display in the user interface. The configuration file can include function calls (described below) to achieve the adjustment in appearance or functionality of the input elements.

In some embodiments, the container application 103 includes function calls (also called 'callbacks') designed to access native functionality of the mobile device 102. For example, the container application 103 can access a digital camera apparatus coupled with the mobile device 102 and/or digital camera software installed on the mobile device 102. In another example, the container application 103 can utilize a pop-up loading screen message or alert badge functionality that is part of the palette of functions provided by the operating system of the mobile device 102.

The container application 103 can execute function calls by embedding the function calls in links or input elements that are displayed on the mobile device 102. When the user interacts with an input element that contains a reference to a function call, the container application 103 parses the function call and executes the appropriate functionality for that function call. In some embodiments, the function call references a feature within the operating system of the mobile device 102. In some embodiments, the function call references a feature within the container application 103. The container application 103 can append arguments to the function call that operate to configure the particular execution of the function call.

An illustrative list of function calls is provided below:

showLogin—displays the login screen for the container application.

hideLogin—hides the login screen and displays, e.g., a default landing screen.

showLoading—displays a loading message indicator to inform the user that information is being loaded into the application.

hideLoading—hides the loading message indicator.

switchTab—switches to a particular tab within the application. This function call takes an argument with the tab name that is being activated (e.g., switchTab:TradingTab).

deleteTabs—deletes one or more tabs from the list of tabs available in the application. This function call takes an argument with a list of tab names (e.g., deleteTabs: TradingTab,NewsTab).

setBadge—sets the badge of a tab within the application. A badge is a graphical indicator, usually numerical, that indicates the arrival or pendency of an item for review by the user. This function takes arguments for the tab name and the value to which the badge is set (e.g., setBadge: AlertsTab:15).

showURL—opens a URL location in a fullscreen, free-float view within the application. This function takes an argument with the URL to be opened (e.g., showURL: http://www.abc.com).

doBack—returns to the previously displayed screen.

batch—executes one or more function calls in a list. This function call takes an argument with a list of function call names and associated arguments, if any (e.g., batch: switchTab: TradingTab, setB adge: TradingTab:15).

evalJS—executes JavaScript logic on a tab. This function call takes arguments with the tab name and the JavaScript logic to be executed.

The communications network 104 channels communications from the mobile device 102 to the server 106. The network 104 may be a local network, such as a LAN, or a wide area network, such as the Internet or the World Wide Web. The network 104 may utilize satellite or other wireless communications technology. For example, the mobile device 102 may send and receive information via a communications link to a satellite, which in turn communicates with the server 106. The mobile device 102 and the server 106 can transmit data using standard formatting and/or transmission protocols, such as XML, HTTP, HTTPS, SMS, JSON, or other similar data communication techniques.

The server computing device 106 communicates with the mobile device 102 via a communications network, e.g., communications network 104. The server 106 includes a mobile application configuration module 110. The mobile application configuration module 110 provides a data interface between the mobile device 102 and the server 106.

Figure 2:
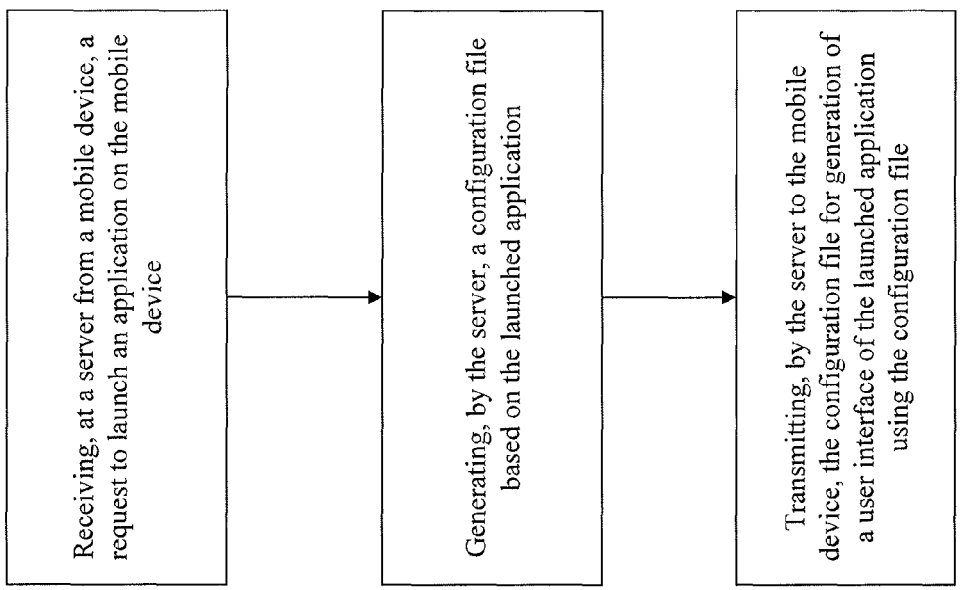
FIG. 2 is a flow diagram of a method for dynamically generating a mobile application.

FIG. 2 is a flow diagram 200 of a method for dynamically generating a mobile application using the system 100 of FIG. 1. The server computing device 106 receives (202) a request to launch an application (e.g., container application 103) on the mobile device 102. In some embodiments, the request includes context data used by the server computing device 106 to understand the identity of the application being launched at the mobile device 102. For example, when a user clicks or activates the container application 103 on the mobile device 102, the device 102 generates a request containing an identifier (e.g., name) of the container application 103. The context data can be further augmented with other data derived from the container application 103, the device 102 itself, and/or the user of the device 102. The context data may include any number of parameters or attributes that provide context for the request, including but not limited to: mobile device hardware type, mobile device operating system version, container application version, network connection type, request header information (e.g., date, time, source address, destination address), encryption information, transmission protocol information, user demographics, and the like.

Upon receiving the request to launch the container application 103, the mobile application configuration module 110 at the server computing device 106 generates (204) a configuration file based on the launched application. The configuration file contains attributes related to appearance and functionality of the container application 103. As described in more detail below, the configuration file changes the look, feel and function of the container application 103 based on the data contained therein. The use of a configuration file that is generated at the server 106 and transmitted to the mobile device 102 enables the container application 103 to be easily and quickly customized for each of a large number of different users. The use of a configuration file also reduces the need for extensive device- or application-specific code to be resident inside the container application 103. Instead, the container application 103 can contain a smaller set of device-specific features that are leveraged by the configuration file to greatly increase the customization options. Also, based on other requests (e.g., navigation, login, transactional) received from the mobile device 102, the mobile application configuration module 110 can generate one or more additional configuration files at different points during use of the container application 103.

The user interface of the container application 103 is also configurable to appear to the user as though it is native to the operating system of the mobile device 102. The user interface of the container application can include elements that are native to the operating system of the mobile device 102 (e.g., buttons, input mechanisms, alerts, badges, pop-up windows). The user interface of the container application 103 can also include elements associated with browser functionality resident on the mobile device 102. In some embodiments, the browser functionality can be invoked using classes and/or objects native to the operating system of the mobile device 102 (e.g., WebView of the Android operating system). As explained in more detail throughout the specification, the user interface of the container application 103 can include any number of these types of elements in many different configurations without departing from the scope of the invention.

In some embodiments, the mobile application configuration module 110 parses the context data received as part of the request to determine how the configuration file is generated. For example, upon receiving a request identifying a particular container application 103 (e.g., WealthCentral application), the module 110 can generate a configuration file that contains a set of properties required for that particular application 103. In some embodiments, the module 110 may retrieve the set of properties from data source 108 by accessing a configuration database for the application 103.

The configuration file generated by the mobile application configuration module 110 can also contain properties based on other elements of the context data. For example, the request may include the identity of a company or other business entity associated with the launched application 103. The business entity can be the provider of the launched application 103 or the provider of a service or feature offering that is accessed via the launched application 103. The mobile application configuration module 110 can generate the configuration file to contain properties that enable configuration of the launched application 103 according to specifications established by the business entity.

Figure 3:
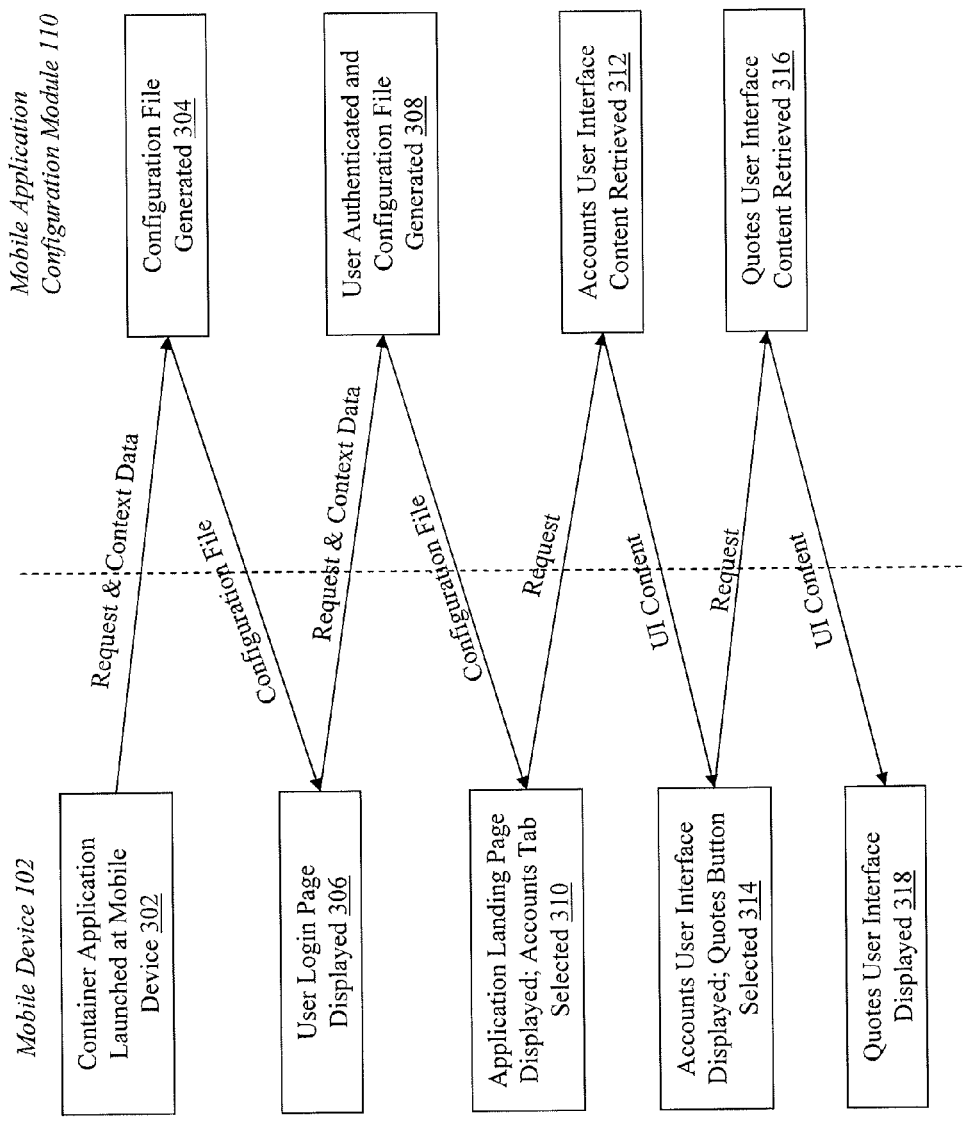
FIG. 3 is a workflow diagram of a process for launching and configuring the container application on the mobile device 102.

The techniques described above will now be explained in more detail through an example use case. FIG. 3 is a workflow diagram of a process 300 for launching and configuring the container application (e.g., container application 103) on the mobile device 102 by using the system 100 of FIG. 1. FIGS. 4-8 are screenshots of a user interface of the container application 103 on the mobile device 102 during the process 300 of FIG. 3, as configured by the mobile application configuration module 110 of the server 106.

Figure 4:
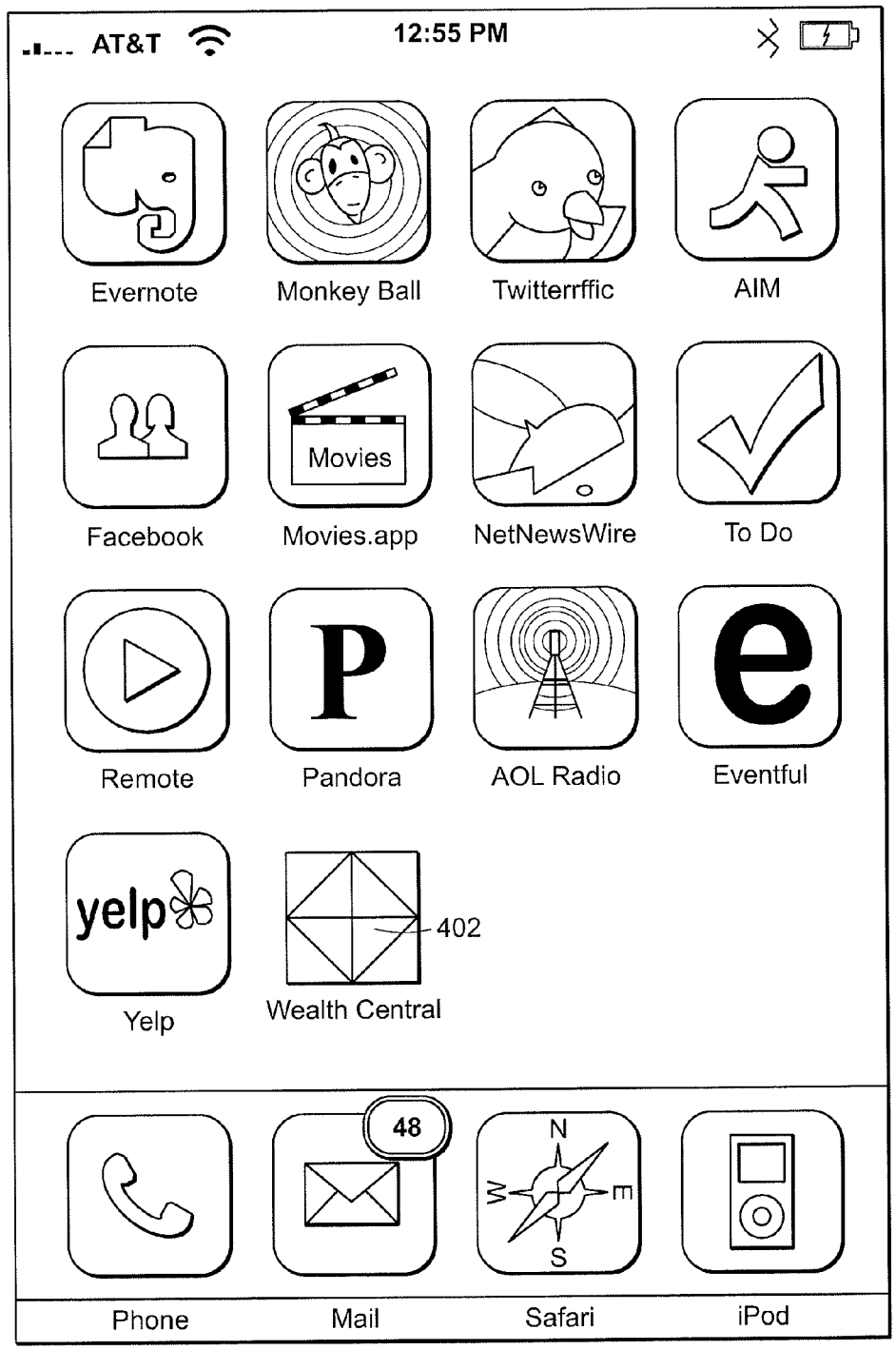
FIG. 4 is a screenshot of a home screen of a dynamically generated application on a mobile device.

Prior to use, the container application 103 is installed on the mobile device 102. After installation, for example, an icon 402 for the container application 103 (e.g., Wealth Central) appears in the home screen 400 of the mobile device 102, as shown in FIG. 4. To launch (302) the container application 103, the user interacts with the mobile device 102 in some way (e.g., for touchscreen devices, the user taps the appropriate icon 402).

Once the container application 103 is launched (302) on the mobile device 102, the mobile device 102 transmits a request to the mobile application configuration module 110 on the server computing device 106. The request includes context data associated with the launched application. In this example, the request includes data to identify the launched application as the Wealth Central application from Fidelity. Because the mobile application configuration module 110 knows that the Wealth Central application has been launched, the module 110 generates a configuration file that contains appropriate structure and information for the Wealth Central application.

During transmission of the request by the mobile device 102 and generation of the configuration file by the module 110, the container application 103 can display a Loading screen (e.g., a spinning wheel or the like) to indicate to the user that the application is starting up and loading necessary data for first-time use. The container application 103 can cause the Loading screen to be displayed by executing the appropriate function call (e.g., showLoading) to the operating system of the mobile device 102.

The mobile application configuration module 110 generates (304) the configuration file based on the context data in the request, including the data that identifies Wealth Central as the launched application. At this point, the module 110 can also determine whether a session already exists between the container application 103 on the mobile device 102 and the module 110 on the server 106. The session can be established based on any number of different considerations, including but not limited to the requirements of the communications protocol used between the devices 102, 106, management of application state information between the container application 103 and the module 110, or the need for authentication of the user of the mobile device 102. A session may already exist if, for example, the container application 103 has been used prior to the current launch within a predetermined amount of time (e.g., 5 minutes) and the mobile device 102 has not been powered off in the interim. In this example, the container application 103 is being launched for the first time after the device 102 is powered on, so communications between the container application 103 on the mobile device 102 and the module 110 on the server 106 has not been initiated yet, therefore no session exists.

The configuration file contains a series of parameters that control the user interface and functionality of the configuration application 103. In this example, the module 110 determines that the Wealth Central application is launched and no session currently exists between the mobile device 102 and the server 106. As a result, the module 110 generates a configuration file for display of a login screen in the container application 103. In some embodiments, the module 110 generates the configuration file by retrieving parameters or other information (e.g., images, links) from a database (e.g., data source 108) that are pre-established for use with the Wealth Central application.

An example configuration file generated by the module 110 is a Tab Configuration JSON object that contains the following properties:
- msgTxt—Message to be displayed before the login screen (optional);
- msgTitle—Title for above message (optional);
- stopApp—Indicates if the user can continue using the container application or not (optional);
- updateUrl—URL for downloading the latest version of the container application (optional);
- updateLabel—Label for the updateURL (optional);
- headerBkgr—RBG color values for the container application header;
- cacheLifetimeDays—Lifetime of the container application image cache;
- loginUrl—Login URL for the container application;
- tabs—Configuration object for all available tabs. Contains:
    - label—Label (i.e., name) of the tab;
    - image—PNG image to be displayed for the tab;
    - url—Initial URL to be loaded for the tab;
    - isPreload—Indicator for preloading the tab immediately after login;
    - supportRotation—Indicator for supporting rotation of the tab.

Once the module 110 generates the configuration file, the module 110 transmits the configuration file to the container application 103 on the mobile device. Based on the configuration file, the container application 103 configures the user interface of the application and executes any logic or commands indicated in the configuration file. For example, if the version of the container application 103 that was launched on the mobile device 102 is out of date, the module 110 sets parameters in the configuration file so that the container application 103 performs a series of functions to inform the user to update the application 103:
- msgTxt="The current version of this app is out of date. Please update your application.";
- stopApp=true;
- updateUrl=http://appstore.apple.com
- updateLabel=Download Based on the above settings, the container application 103 determines that the msgTxt parameter is not blank and the stopApp parameter is true, and the container application 103 displays a pop-up message with the message in the msgTxt field. The pop-up message does not contain a continue button because stopApp is true, meaning that the user should not be allowed to progress further with the application 103. The container application 103 also determines that updateUrl and updateLabel are not blank, so the pop-up message also contains an update button labeled with updateLabel that when selected, launches a browser window pointing to updateUrl that allows the user to obtain the most current version of the application 103. However, if the container application 103 is already the most current version, the module 110 generates a configuration file that does not have the parameters set in this way.

Figure 5:
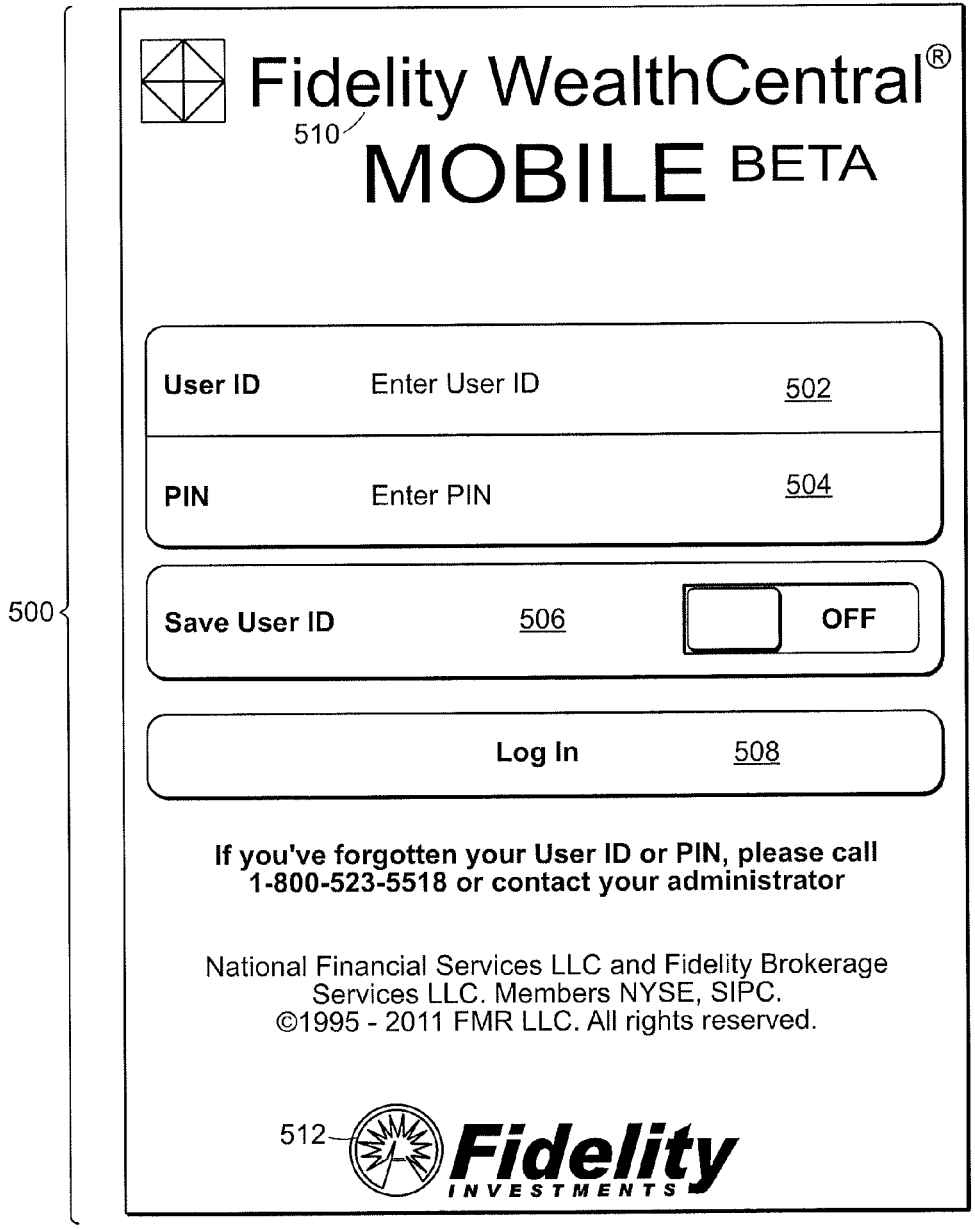
FIG. 5 is a screenshot of a login screen of a dynamically generated application on a mobile device.

Continuing with FIG. 3, the container application 103 displays (306) a login screen, as shown in FIG. 5. Because the configuration file received from the module 110 included a loginUrl parameter, the container application 103 includes in the user interface an area with browser functionality 500. The container application 103 issues a request to the URL indicated in the loginUrl parameter, and displays the web content returned from the URL request in the browser area 500. In this manner, as with other user interface screens described herein, the user interface comprises web content that is dynamically retrieved from a server, instead of the user interface being stored or pre-coded into the container application 103 itself. As a result, the user interface can be quickly and easily changed for a large number of users by simply altering the web content—rather than being required to alter the configuration application and forcing users to download an updated version each time the user interface is updated.

The login screen includes fields for entering the user ID 502 and PIN 504, and a toggle switch input 506 that enables the container application 103 to save the user ID so that the user can avoid re-entering the user ID upon subsequent uses of the application 103. The container application also displays a Log In button 508. In this example, the user ID 502 and PIN 504 are fields contained in the web content that the container application 103 displays based on the updateUrl field in the configuration file. The application 103 changes the appearance of the fields 502 and 504 to appear like other similar fields in native applications on the mobile device 102. Because the fields 502 and 504 share an appearance similar to that of fields in native applications, the user assumes that the container application 103 is native to the mobile device 102 instead of a browser-based user interface that is downloaded using a URL.

In certain areas of the screen (e.g., 510, 512), the user interface displays images associated with the Wealth Central application. In some embodiments, the images are downloaded as part of the web content request. In some embodiments, the images are stored as part of the container application 103 and the configuration file controls the display of the images in the user interface.

Once the user enters his or her ID and PIN in the appropriate fields and presses the Log in button 506, the container application 103 transmits context data to the mobile application configuration module 110 with the entered credential information (in this case, the user ID and PIN). The module 110 authenticates (308) the user based on the credential information and determines his or her level of access to the Wealth Central application. For example, a first user may only be entitled to access his accounts and receive financial news, but a second user may be entitled to access her accounts, receive quotes for potential transactions/trades, and execute transactions using the application. As indicated above, the Tab Configuration JSON object previously transmitted to the container application 103 contains parameters to configure the appearance of all available tabs, including fields such as label, image, url. The module 110 now generates (308) an additional configuration file that includes parameters to configure the tabs available to the user after login has completed. Also, during the login process, the container application 103 can display a Loading screen by using the showLoading function call.

Once the module 110 has verified the credentials and authenticated the user, the module 110 transmits the additional configuration file to the container application 103. The container application 103 then loads the tabs based on the Tab Configuration JSON object previously received from the mobile application configuration module 110. As part of the tab loading process, the container application 103 issues requests and receives content from locations based on the url field for each tab. The container application 103 may locally cache images contained in the web content that it receives to enable faster access during future use of the application 103. The container application 103 also reloads images it has previously cached if those images are older than a pre-defined expiration date. Further, a session is created between the container application 103 on the mobile device 102 and the mobile application configuration module 110 on the server 106. The session acts to preserve the context of the conversation between the two devices 102, 106 and two applications 103, 110 such that navigation of the application 103 and interaction with the module 110 is enhanced. For example, the container application 103 is now aware of the identity of the user, based on the authenticated credential information. The container application 103 does not need to continually re-authenticate the user every time the application 103 issues an information request or transaction command to the module 110. Also, the container application 103 can use the preserved context information to improve the navigation capabilities of the user interface. In one example and as explained in more detail below, when a user navigates between tabs in the application 103, the application can request customized web content based on, e.g., the identity of the user in the session context data, and present the customized web content in the user interface without requiring additional inputs.

It should be noted that the identity of the user is not limited to personal information (name, address). A user can also be associated with a company or a group that has certain pre-defined attributes that are reflected in user interface of the container application 103. In one example, the container application 103 can dynamically change the user interface appearance based on the company associated with the user. The container application 103 may download and/or display images (e.g., logos) that are specific to the company based on the context of the session, thereby providing a branded experience to the user. The context enables the application 103 to make appearance changes without requiring extensive reconfiguration of the application 103 (e.g., in the case of a pre-stored and pre-compiled user interface). Because the container application 103 preserves the context as the user navigates, the application 103 is uniquely customized to the user.

Next, the container application 103 deletes any tabs that the authenticated user is not entitled to access. For example, a user may only be entitled to access the Accounts and Clients tabs, but be unable to access the News tab. The configuration file received by the container application 103 identifies which tabs the user can view (e.g., Accounts, Clients). The container application 103 determines the remaining tabs that should not be displayed in the user interface and calls the deleteTabs function call (explained above) with arguments for each tab to be removed.

Figure 6:
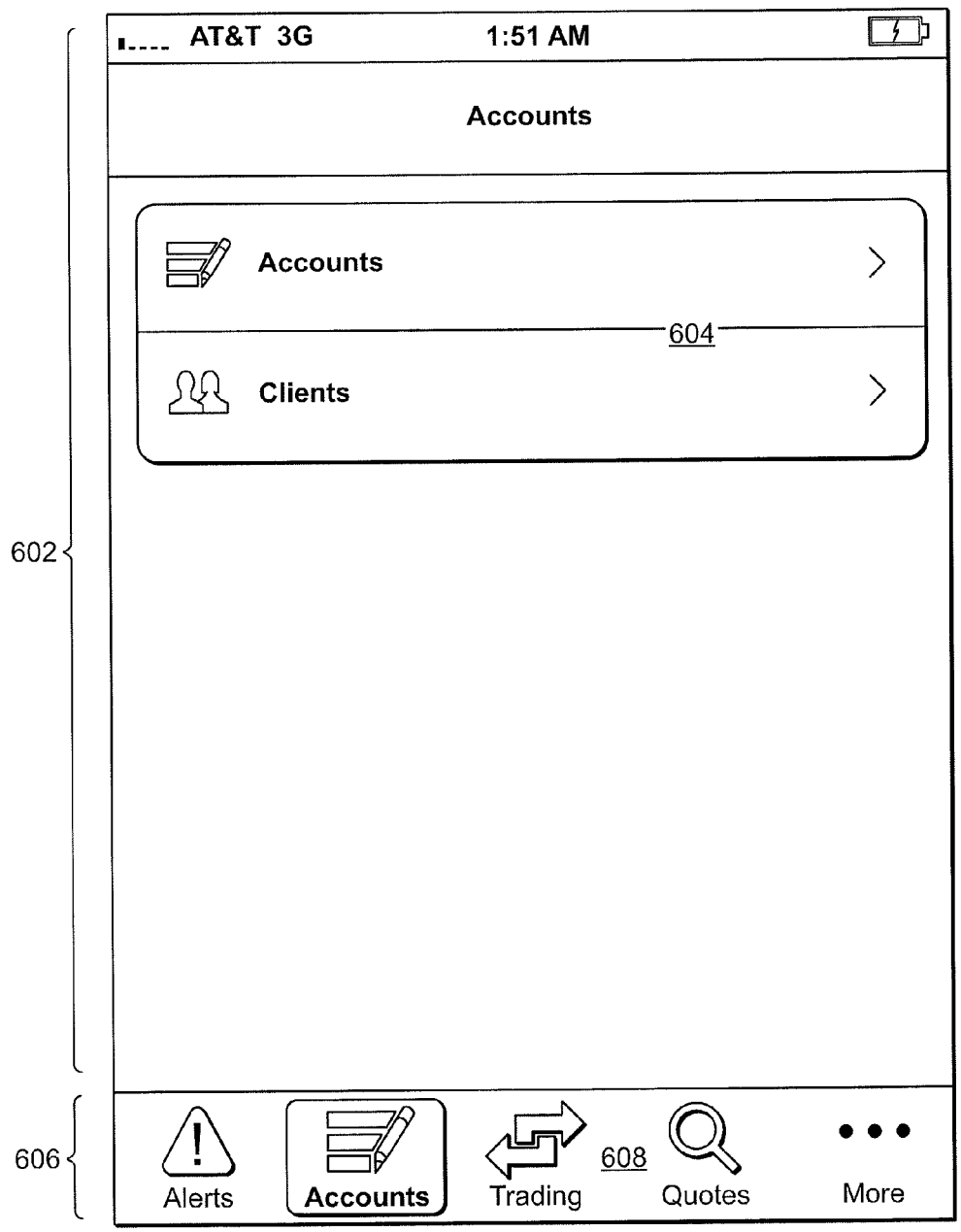
FIG. 6 is a screenshot of a landing screen of a dynamically generated application on a mobile device.

Once the application 103 has completed configuration of the tabs, the application displays (310) the landing screen, as shown in FIG. 6. The user interface of the landing screen is divided into two sections: the top section 602 is a display area using browser functionality of the mobile device 102 to display the list of available tabs 604, and the bottom section 606 is a display area containing a menu bar 608 with a series of buttons that are native to the operating system of the mobile device 102. As with the Login screen, the application 103 changes the appearance of the list of available tabs 604 to appear as though it was generated by the native operating system. Also, the container application 103 configures the menu bar 608 to contain only those buttons that correspond with tabs or functionality to which the user is entitled access. In combination, the top area 602 and the bottom area 606 appear to the user as though the user interface is seamlessly generated by the native operating system, when the top area is generated through use of web content retrieved from a URL and the bottom area is native content. Upon being presented with the landing screen, the user can select one of the available tabs 604 or one of the buttons in the menu bar 608. In this example, the user selects (310) the Accounts tab. As described previously, the container application 103 uses the configuration file to determine the URL provided in the url field for the Accounts tab. The URL can, but does not have to, point to the server 106. The URL can point to another server (not shown) that provides web content to the container application 103.

Figure 7:
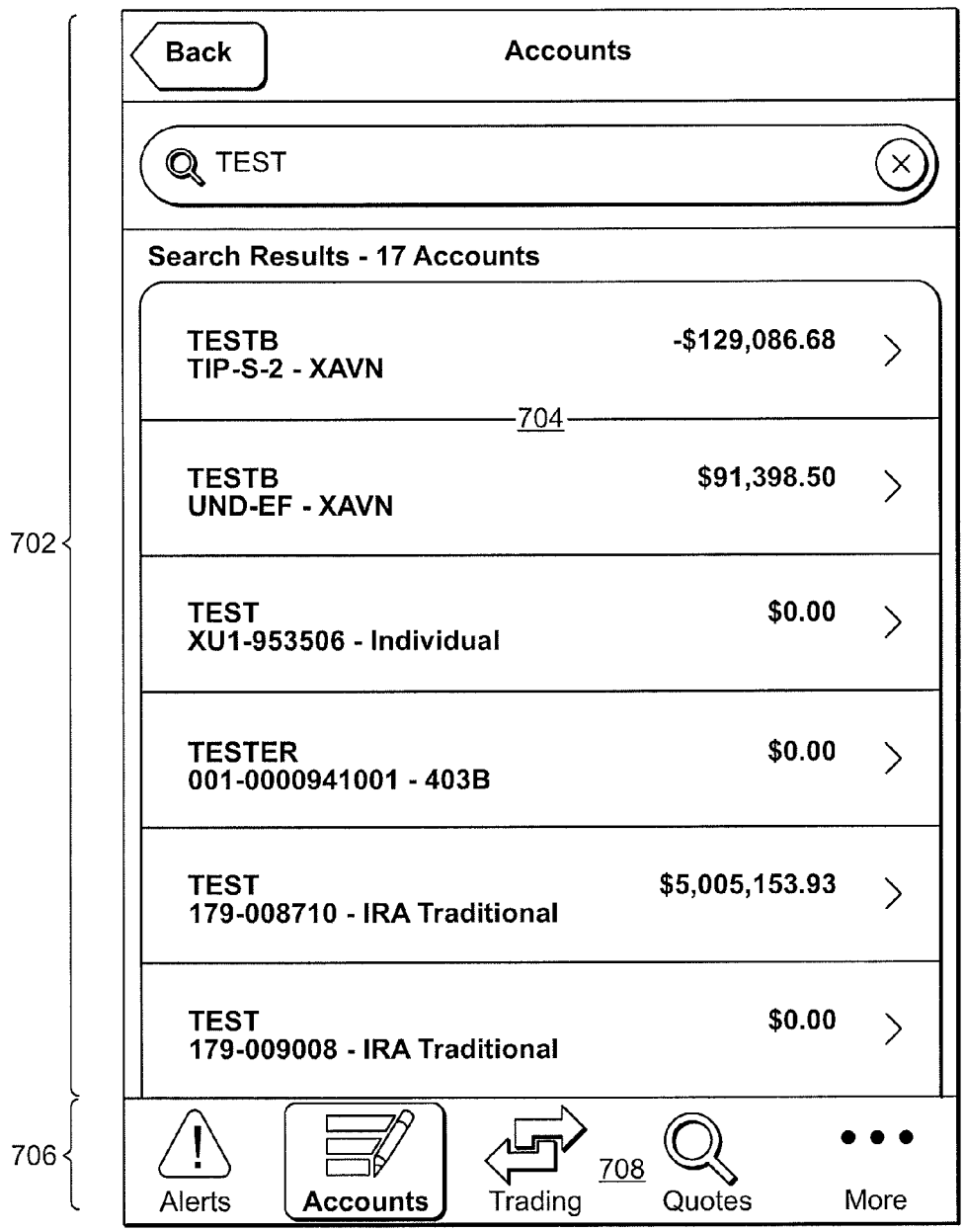
FIG. 7 is a screenshot of an Accounts screen of a dynamically generated application on a mobile device.

The container application 103 issues a request to the server identified in the Accounts tab URL, the identified server retrieves (312) UI content for the Accounts tab, and the application 103 receives the UI content in response to the request. The container application 103 displays (314) the Accounts tab, as shown in FIG. 7. The Accounts screen contains a top area 702 containing a list of accounts 704 available for viewing based on the context data (e.g., user's credentials), and a bottom area 706 containing a menu bar 708 with buttons native to the operating system. Similar to the landing screen, the top area 702 is generated through use of web content retrieved from the Accounts tab URL and the bottom area 706 is native content. In this example, the user then selects (314) the Quotes button in the menu bar 706 at the bottom of the screen. Similar to the tabs, the Quotes button (and the other buttons in the menu bar 706) can have an associated URL. In some embodiments, each of the buttons in the menu bar 706 corresponds to a tab of the container application 103.

Figure 8:
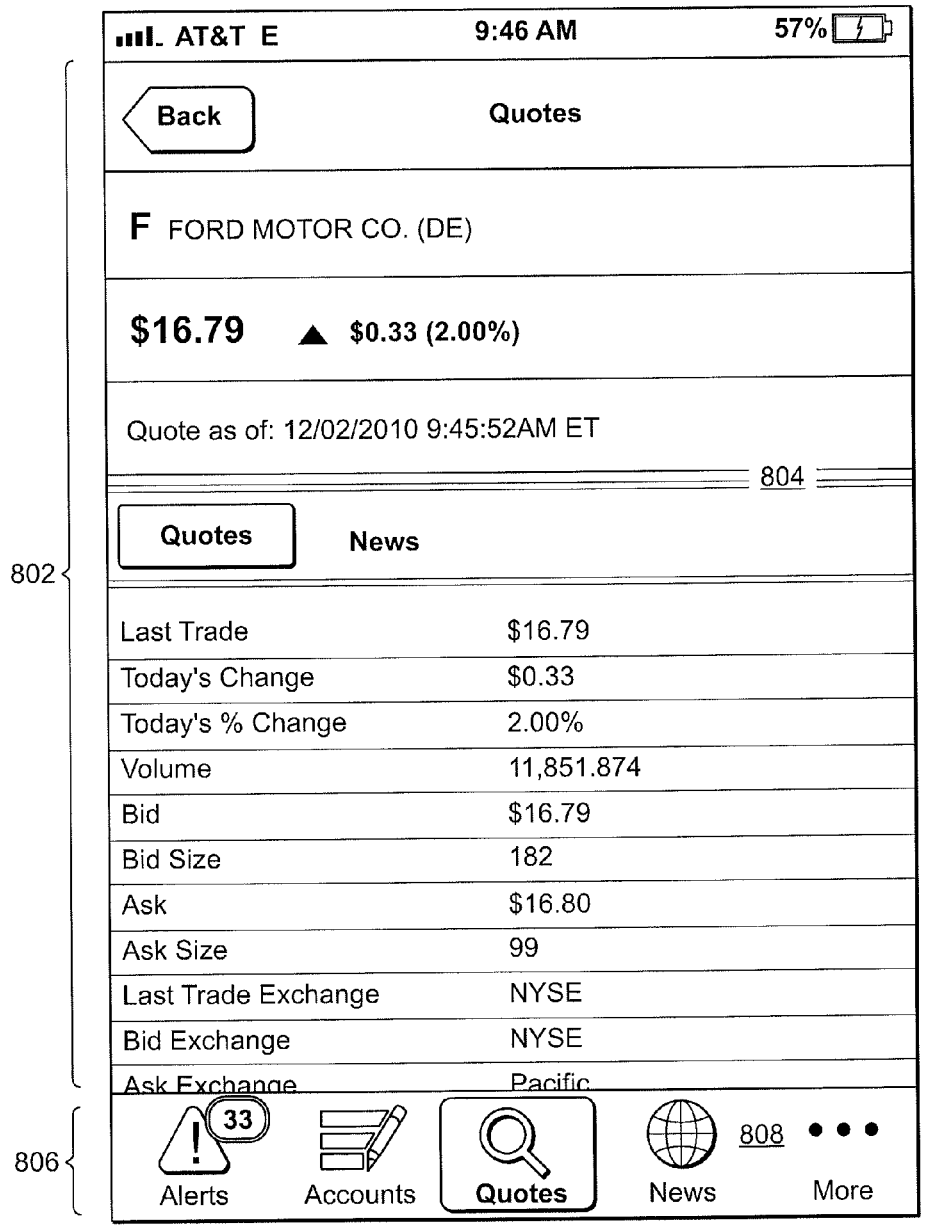
FIG. 8 is a screenshot of a Quotes screen of a dynamically generated application on a mobile device.

The container application 103 issues a request to the server identified in the Quotes tab URL, the identified server retrieves (316) UI content for the Quotes tab, and the application 103 receives the UI content in response to the request. The container application 103 displays (318) the Quotes tab, as shown in FIG. 8. The Quotes screen contains a top area 802 containing the current pricing information for a tradable security 804 (e.g., Ford stock) available for viewing based on the context data (e.g., user's credentials), and a bottom area 806 containing a menu bar 808 with buttons native to the operating system. Similar to the landing screen and Accounts tab, the top area 802 is generated through use of UI content retrieved from the Quotes tab URL and the bottom area 806 is native content.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, and/or other communication protocols.

Devices of the computing system can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a World Wide Web browser (e.g., Microsoft® Internet Explorer® available from Microsoft Corporation, Mozilla® Firefox available from Mozilla Corporation). Mobile computing device include, for example, a Blackberry®. IP phones include, for example, a Cisco® Unified IP Phone 7985G available from Cisco Systems, Inc, and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein.

What is claimed is:

1. A computer-implemented method for dynamically generating a mobile application, the method comprising:

receiving, at a server computing device from a mobile device, a request to launch a container application installed on the mobile device and designed to interact with an operating system of the mobile device, the request including container application context data that corresponds to attributes of the mobile device, attributes of a network connection between the mobile device and the server computing device, and attributes of an application workflow requested by a user of the mobile device to include identity of an application to be launched in the container application;

generating, by the server computing device, a first configuration file based on the launched container application including the container application context data wherein a determination is made using the container application context data if the current version of the container application is out of date to include in the first configuration file an update uniform resource locator (URL) used for downloading a latest version of the container application which is to be presented to the user of the mobile device;

receiving, at the server computing device from the mobile device, a login request associated with the launched container application, the login request including user credentials;

determining, by the server computing device, a user context, to include a user level of access and entitled functionality of the launched application, based on the user credentials;

generating, by the server computing device, a second configuration file based on the user context, wherein the second configuration file includes at least some of the same content as the first configuration file as well as parameters to configure the appearance of all available native controls presented to the user;

transmitting, by the server computing device to the mobile device, the second configuration file for generation of a user interface of the launched container application using the second configuration file, the user interface comprising a first display area using a first web browser located on the mobile device to display one or more web page elements described in the second configuration file and formatted by the server computing device, the mobile device parsing the second configuration file to configure appearance characteristics of the web page elements to resemble elements built into the operating system of the mobile device without converting the web page elements as represented in the second configuration file into another format, and a second display area having one or more interface elements that are built into the operating system of the mobile device.

2. A computer-implemented method for dynamically generating a mobile application, the method comprising:

sending, by a mobile device to a server computing device, a request to launch a container application installed on the mobile device and designed to interact with an operating system of the mobile device, the request including container application context data that corresponds to attributes of the mobile device, attributes of a network connection between the mobile device and the server computing device, and attributes of an application workflow requested by a user of the mobile device to include identity of an application to be launched in the container application;

receiving, by the mobile device from the server computing device, a first configuration file based on the launched container application wherein the first configuration file comprises an update uniform resource locator (URL) used for downloading a latest version of the container application if a current version being launched by the user is out of date;

sending, by the mobile device to the server computing device, a login request associated with the launched container application, the login request including user credentials;

determining, by the server computing device, a user context, to include a user level of access and entitled functionality of the launched application, based on the user credentials;

generating, by the server computing device, a second configuration file based on the user context, wherein the second configuration file includes at least some of the same content as the first configuration file as well as parameters to configure the appearance of all available native controls presented to the user; and generating, by the mobile device, a user interface of the launched container application using the second configuration file, the user interface comprising a first display area using a first web browser located on the mobile device to display one or more web page elements described in the second configuration file and formatted by the server computing device, the mobile device parsing the second configuration file to configure appearance characteristics of the web page elements to resemble elements built into the operating system of the mobile device without converting the web page elements as represented in the second configuration file into another format, and a second display area having one or more interface elements that are built into the operating system of the mobile device.

3. The method of claim 1, the user interface further comprising a third display area.

4. The method of claim 1, wherein the first display area further includes one or more interface elements that are built into the operating system of the mobile device.

5. The method of claim 1, wherein the second display area further includes a second web browser located on the mobile device to display one or more of the web page elements described in the second configuration file and formatted by the server computing device, the mobile device parsing the second configuration file to configure appearance characteristics of the web page elements to resemble elements built into the operating system of the mobile device without converting the web page elements as represented in the second configuration file into another format.

6. The method of claim 1, wherein generation of the user interface includes removing at least one of an element of the first display area and an element of the second display area from display based on the user context or the second configuration file.

7. The method of claim 1, wherein generation of the user interface includes adding at least one of an element of the first display area and an element of the second display area to display based on the user context or the second configuration file.

8. The method of claim 1, wherein the second configuration file describes one or more additional web page elements retrieved from the server in response to a navigation command received from the mobile device; and the first display area uses the first web browser to display the one or more additional web page elements described in the second configuration file and formatted by the server computing device, the mobile device parsing the configuration file to configure appearance characteristics of the web page elements to resemble elements built into the operating system of the mobile device without converting the web page elements as represented in the second configuration file into another format.

9. The method of claim 8, further comprising determining, by the mobile device, which of the one or more additional web page elements to display in the first display area based on the user context or the second configuration file.

10. The method of claim 8, the navigation command including a server location for the one or more additional web page elements.

11. The method of claim 10, wherein the server location is a URL address.

12. The method of claim 1, wherein the user context is associated with a company, a role, an application, a user persona, or any combination thereof.

13. The method of claim 1, wherein the second configuration file includes URL addresses for retrieving one or more image files from the server, the image files being displayed in at least one of the first display area and the second display area.

14. The method of claim 1, wherein the second configuration file is a text-based file used for data interchange.

15. The method of claim 1, the generating a second configuration file comprising:
retrieving, by the server computing device, a stored configuration file based on the user context.

16. The method of claim 1, the generating a second configuration file comprising:
retrieving, by the server computing device, configuration data based on the user context; and
building, by the server computing device, the second configuration file using the retrieved configuration data.

17. The method of claim 1, wherein the launched container application includes function calls associated with functions built into the operating system of the mobile device and the one or more web page elements include URL addresses that identify the function calls to request execution of the associated functions by the operating system.

18. The method of claim 17, wherein execution of the function calls causes the appearance of the launched container application to change.

19. The method of claim 1, further comprising:
retrieving, by the server computing device, one or more additional web page elements based on the launched container application;
transmitting, by the server computing device, the one or more additional web page elements to the mobile device for storage at the mobile device and later display in the first display area.

20. The method of claim 1, wherein the one or more interface elements are input elements, notification elements, navigation elements, or any combination thereof.

21. The method of claim 1, wherein the first display area is located inside of a control associated with the operating system of the mobile device.

22. A computer-implemented system for dynamically generating a mobile application, the system comprising:
a server computing device configured to:
receive, from a mobile device, a request to launch a container application installed on the mobile device and designed to interact with an operating system of the mobile device, the request including container application context data that corresponds to attributes of the mobile device, attributes of a network connection between the mobile device and the server computing device, and attributes of an application workflow requested by a user of the mobile device to include identity of an application to be launched in the container application;

generate a first configuration file based on the launched container application including the container application context data wherein a determination is made using the container application context data if the current version of the container application is out of date to include in the first configuration file an update uniform resource locator (URL) used for downloading a latest version of the container application which is to be presented to the user of the mobile device;

receive, from the mobile device, a login request associated with the launched container application, the login request including user credentials;

determine a user context, to include a user level of access and entitled functionality of the launched application, based on the user credentials;

generate a second configuration file based on the user context, wherein the second configuration file includes at least some of the same content as the first configuration file as well as parameters to configure the appearance of all available native controls presented to the user;

transmit, to the mobile device, the second configuration file for generation of a user interface of the launched container application using the second configuration file, the user interface comprising a first display area using a first web browser located on the mobile device to display one or more web page elements described in the second configuration file and formatted by the server computing device, the mobile device parsing the second configuration file to configure appearance characteristics of the web page elements to resemble elements built into the operating system of the mobile device without converting the web page elements as represented in the second configuration file into another format, and a second display area having one or more interface elements that are built into the operating system of the mobile device.

23. A computer program product, tangibly embodied in a non-transitory computer readable storage medium, for dynamically generating a mobile application, the computer program product including instructions operable to cause a data processing apparatus to:

receive, from a mobile device, a request to launch a container application installed on the mobile device and designed to interact with an operating system of the mobile device, the request including container application context data that corresponds to attributes of the mobile device, attributes of a network connection between the mobile device and the server computing device, and attributes of an application workflow requested by a user of the mobile device to include identity of an application to be launched in the container application;

generate a first configuration file based on the launched container application including the container application context data wherein the first configuration file comprises an update uniform resource locator (URL) used for downloading a latest version of the container application if a current version being launched by the user is out of date;

receive, from the mobile device, a login request associated with the launched container application, the login request including user credentials;

determine a user context, to include a user level of access and entitled functionality of the launched application, based on the user credentials; generate a second configuration file based on the user context, wherein the second configuration file includes at least some of the same content as the first configuration file as well as parameters to configure the appearance of all available native controls presented to the user;

transmit, to the mobile device, the second configuration file for generation of a user interface of the launched container application using the second configuration file, the user interface comprising a first display area using a first web browser located on the mobile device to display one or more web page elements described in the second configuration file and formatted by the server computing device, the mobile device parsing the second configuration file to configure appearance characteristics of the web page elements to resemble elements built into the operating system of the mobile device without converting the web page elements as represented in the second configuration file into another format, and a second display area having one or more interface elements that are built into the operating system of the mobile device.

\* \* \* \* \*

UNITED STATES PATENT AND TRADEMARK OFFICE
CERTIFICATE OF CORRECTION

PATENT NO.          : 8,918,712 B2                                  Page 1 of 1
APPLICATION NO.     : 13/324662
DATED               : December 23, 2014
INVENTOR(S)         : Nario et al.

It is certified that error appears in the above-identified patent and that said Letters Patent is hereby corrected as shown below:

In the Claims,

In claim 1, under column 16, line 33: add a ":" after the word "comprising"

In claim 1, under column 16, move the word "a" from line 33 to line 34 before the words "first display"

In claim 2, under column 17, line 18: add a ":" after the word "comprising"

In claim 22, under column 19, line 29: add a ":" after the word "comprising"

In claim 23, under column 20, line 32: add a ":" after the word "comprising"

Signed and Sealed this
Twelfth Day of May, 2015

Michelle K. Lee
*Director of the United States Patent and Trademark Office*